US011933202B2

(12) United States Patent
Frazier et al.

(10) Patent No.: US 11,933,202 B2
(45) Date of Patent: Mar. 19, 2024

(54) DYNAMIC CYLINDER DEACTIVATION LIFE FACTOR TO MODIFY CYLINDER DEACTIVATION STRATEGY

(71) Applicants: Cummins Inc., Columbus, IN (US); Tula Technology, Inc., San Jose, CA (US)

(72) Inventors: Timothy R. Frazier, Columbus, IN (US); J. Steven Kolhouse, Columbus, IN (US); Steven J. Small, Columbus, IN (US); Louis Joseph Serrano, San Jose, CA (US)

(73) Assignees: Cummins Inc., Columbus, IN (US); Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/870,452

(22) Filed: Jul. 21, 2022

(65) Prior Publication Data

US 2022/0364486 A1 Nov. 17, 2022

Related U.S. Application Data

(63) Continuation of application No. PCT/US2020/070856, filed on Dec. 4, 2020.
(Continued)

(51) Int. Cl.
*F01L 13/00* (2006.01)
*F01L 9/10* (2021.01)
(Continued)

(52) U.S. Cl.
CPC ............. *F01L 13/0005* (2013.01); *F01L 9/10* (2021.01); *F02D 13/0223* (2013.01);
(Continued)

(58) Field of Classification Search
CPC ... F01L 9/10; F01L 13/0005; F01L 2013/001; F02D 13/0223; F02D 13/06; F02D 41/0087
See application file for complete search history.

(56) References Cited

U.S. PATENT DOCUMENTS 5,636,609 A 6/1997 Fujiyoshi
6,739,123 B2 5/2004 Glugla et al.
(Continued)

FOREIGN PATENT DOCUMENTS

CN 105608316 A * 5/2016 ............. G06F 19/00
CN 107869395 A 4/2018
(Continued)

OTHER PUBLICATIONS

CN First Office Action for Application No. CN 202080094652X dated Apr. 22, 2023, 15 pages with English translation.
(Continued)

*Primary Examiner* — Audrey B. Walter
(74) *Attorney, Agent, or Firm* — FOLEY & LARDNER LLP

(57) ABSTRACT

Systems and methods to extend a life of a component of a cylinder deactivation system are provided. A method includes generating, by a controller, an initial life factor for the component; initiating, by the controller, a CDA mode for an engine; determining, by the controller, an actual life factor for the component, the actual life factor determined by comparing a number of switching events of a cylinder in the CDA mode to a number of cycles of the cylinder in the CDA mode; comparing, by the controller, the actual life factor to the initial life factor; and modifying, by the controller based on the comparison, operation of the engine in the CDA mode to adjust the actual life factor.

15 Claims, 9 Drawing Sheets

Related U.S. Application Data

(60) Provisional application No. 62/965,406, filed on Jan. 24, 2020.

(51) Int. Cl.
*F02D 13/02* (2006.01)
*F02D 13/06* (2006.01)
*F02D 41/00* (2006.01)

(52) U.S. Cl.
CPC ......... *F02D 13/06* (2013.01); *F02D 41/0087* (2013.01); *F01L 2013/001* (2013.01)

(56) References Cited

U.S. PATENT DOCUMENTS

| | | | | |
|---|---|---|---|---|
| 7,908,913 | B2 | 3/2011 | Cinpinski et al. | |
| 8,271,141 | B2 | 9/2012 | Cummings et al. | |
| 9,562,470 | B2 | 2/2017 | Younkins et al. | |
| 9,587,567 | B2 | 3/2017 | Mahadevan et al. | |
| 9,890,732 | B2 | 2/2018 | Younkins et al. | |
| 10,323,588 | B2 | 6/2019 | Vanderwege | |
| 2009/0048787 | A1 * | 2/2009 | Sathyanarayana ...... G06F 30/20 | 702/34 |
| 2012/0046853 | A1 | 2/2012 | Silvestri et al. | |
| 2018/0080398 | A1 * | 3/2018 | Leone ................. F02D 41/0087 | |
| 2018/0274457 | A1 * | 9/2018 | McCarthy, Jr. ......... F02D 17/02 | |

FOREIGN PATENT DOCUMENTS

| | | |
|---|---|---|
| WO | WO-2013/059340 | 4/2013 |
| WO | WO-2017/053898 A1 | 3/2017 |
| WO | WO-2017/222632 | 12/2017 |
| WO | WO-2018/235023 | 12/2018 |

OTHER PUBLICATIONS

Foreign Search Report on PCT PCT/US2020/070856 dated Apr. 1, 2021.

* cited by examiner

DYNAMIC CYLINDER DEACTIVATION LIFE FACTOR TO MODIFY CYLINDER DEACTIVATION STRATEGY

CROSS-REFERENCE TO RELATED APPLICATIONS

The present application is a continuation of PCT/US2020/070856, filed Dec. 4, 2020, which claims priority to and the benefit of U.S. Provisional Application No. 62/965,406, filed Jan. 24, 2020, both of which are incorporated by reference herein in their entireties.

TECHNICAL FIELD

The present disclosure relates generally to engine systems with cylinder deactivation.

BACKGROUND

Some vehicles are equipped with cylinder deactivation ("CDA") technology that enables a CDA mode of operation for an engine of the vehicle. CDA refers to the ability to activate and deactivate one or more cylinders of an engine during operation of the engine and vehicle. CDA is typically utilized to conserve fuel by only utilizing a sub-set of the cylinders to power the vehicle. A CDA mode of operation can also be used for other purposes as well, such as, for example, balancing cylinder usage, warming up the engine, and/or keeping the engine and aftertreatment system warm. However, due to the activation/deactivation of the cylinders of the engine, uneven wear may occur with various parts of the engine system (e.g., the cylinders).

SUMMARY

One embodiment relates to a method to extend a life of a component in a cylinder deactivation (CDA) system. The method includes generating, by a controller, an initial life factor for the component; initiating, by the controller, a CDA mode for an engine; determining, by the controller, an actual life factor for the component, the actual life factor determined by comparing a number of switching events of a cylinder in the CDA mode to a number of cycles of the cylinder in the CDA mode. The method further includes comparing, by the controller, the actual life factor to the initial life factor, and modifying, by the controller based on the comparison, operation of the engine in the CDA mode to adjust the actual life factor.

Another embodiment relates to a method of operating a CDA system. The method includes initiating, by a controller, a CDA mode for an engine; determining, by the controller, a first cycle count for a first oil control solenoid of the CDA system; determining, by the controller, a second cycle count for a second oil control solenoid of the CDA system; comparing, by the controller, the first cycle count and the second cycle count; and modifying, by the controller, operation of the CDA mode for the engine based on the comparison.

Yet another embodiment relates to a system comprising a cylinder deactivation (CDA) system and a controller. The controller has a processor and instructions stored in non-transitory machine-readable media. The instructions are configured to cause the controller to generate an initial life factor for a component in the CDA system and initiate a CDA mode for an engine. The instructions are further configured to cause the controller to determine an actual life factor for the component by comparing a number of switching events of a cylinder in the CDA mode to a number of cycles of the cylinder in the CDA mode, and to determine an expected life of the component. The instructions are also configured to cause the controller to compare the actual life factor to the initial life factor and modify operation of the engine in the CDA mode to adjust the actual life factor.

DETAILED DESCRIPTION

Figure 1C:
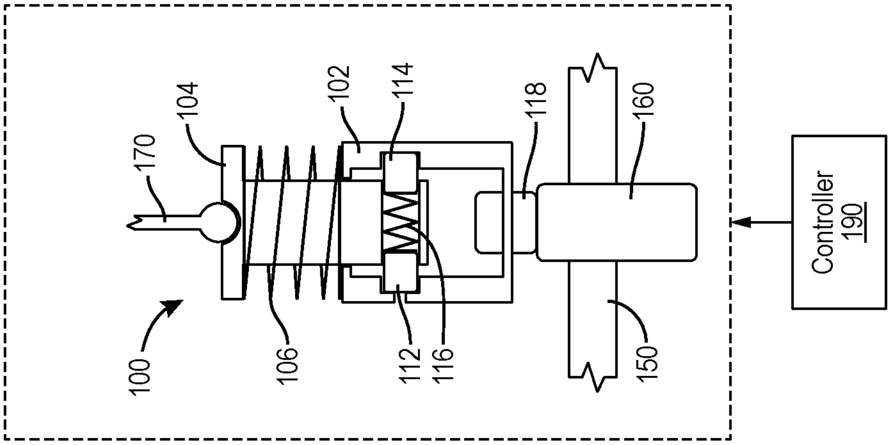
FIGS. 1A-C are illustrations of a controller coupled to a coupling mechanism for a CDA mode of operation for an engine, according to an exemplary embodiment.

Following below are more detailed descriptions of methods, apparatuses, and systems for modifying cylinder deactivation (CDA) strategies to increase the life of one or more CDA components. The methods, apparatuses, and systems introduced above and discussed in greater detail below may be implemented in any of numerous ways, as the described concepts are not limited to any particular manner of implementation. Examples of specific implementations and applications are provided primarily for illustrative purposes.

According to the present disclosure, methods, apparatuses, and systems are disclosed that increase the life of one or more CDA components. During CDA mode, one or more cylinders are deactivated/inactive (i.e., combustion does not occur), such that power from the engine is provided from less than all of the cylinders. In some situations, one or more of the air intake valves may be closed so to not allow air for combustion to flow into the cylinder thereby preventing combustion. In other situations, air may be allowed to flow through the cylinder but combustion is prevented via no spark or diesel fuel injection. Cylinder deactivation mode is a broad term that encompasses various related but distinct cylinder deactivation operating modes. A first type of CDA operating mode is known as "fixed cylinder CDA." In fixed cylinder CDA, the same cylinder(s) are active/inactive each engine cycle during the fixed cylinder CDA operating mode. A second type of CDA operating mode is known as "skip-fire" operating mode. In skip-fire CDA, the cylinder(s) that are active/inactive may change on a cycle-by-cycle basis (e.g., a cylinder may be inactive a first engine cycle and active a second engine cycle). An "active" cylinder means that combustion is allowed to occur in that cylinder. The present disclosure is applicable with each type of CDA operating mode, and the term "CDA mode" or "CDA operating mode" is used to indicate herein that each type of operating mode is possible/applicable with the associated concept(s). In contrast and as referred to herein, the term "non-CDA mode" is used to refer to operation of the engine where each of the cylinders of the engine are active (able to experience to a combustion event). As also referred to herein, "switching" and "switching event" refer to a cylinder changing from being active to inactive and vice versa, where active refers to combustion being allowed to occur in the cylinder and inactive meaning that combustion is prevented from occurring in the cylinder.

When a cylinder regularly alternates being active and inactive (e.g., a switching event), one or more CDA components that prevent the cylinder from being active (such as an oil control solenoid or a coupling mechanism, as described below) are subjected to an elevated amount of wear and tear. As the one or more CDA components have a certain life expectancy (e.g., the number of on/off cycles that can be withstood prior to failure), it is beneficial to manage the number of switching events that occur during the CDA operating mode so as to increase the life of the one or more CDA components. As described herein, the number of switching events is also related to the noise, vibration, and harshness (NVH) experienced by a driver or passenger in the cab of a vehicle. For example, firing one cylinder per cycle is likely to result in bad NVH despite relatively few switching events.

According to the present disclosure and as described in more detail herein, a life factor is utilized to help increase the life of the CDA components. The life factor can be calculated during CDA mode. The life factor can indicate the relative usage of the one or more CDA components associated with each cylinder of the engine during CDA mode. Based on the determined life factor, a controller may modify the CDA mode thereby changing the life factor so as to balance the relative usage of the one or more CDA components. Balancing the relative usage of the one or more CDA components may extend the life of the one or more CDA components.

As alluded to above, CDA may be accomplished in a variety of different ways. In one way, a fuel injector for a cylinder is prevented from injecting fuel into the cylinder (e.g., a controller may prevent a fuel injector associated with a specific cylinder from operating). In another way, an air intake valve for a cylinder is closed to prevent air from flowing into the cylinder for combustion. As an air intake valve is controlled by the rotation of a camshaft, components are needed to prevent the rotation of the camshaft from opening the air intake valve. FIGS. 1A-1C and FIGS. 2A-2B depict an embodiment for maintaining an air intake valve in the closed position. This embodiment is described below.

Figure 1B:
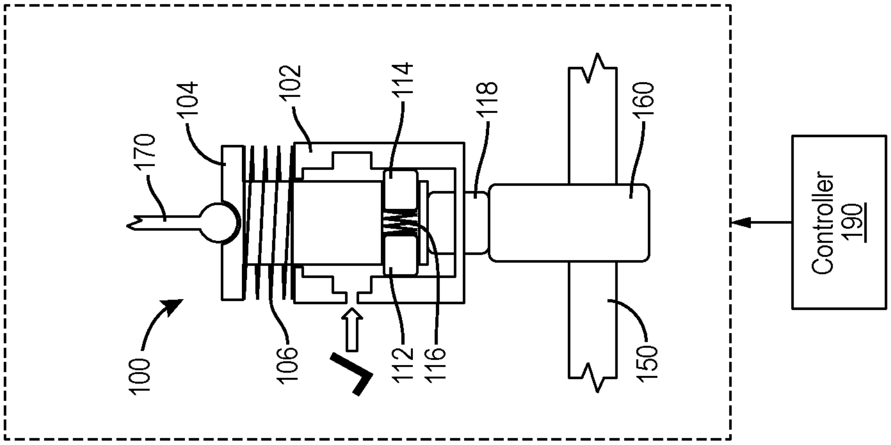
Figure 1A:
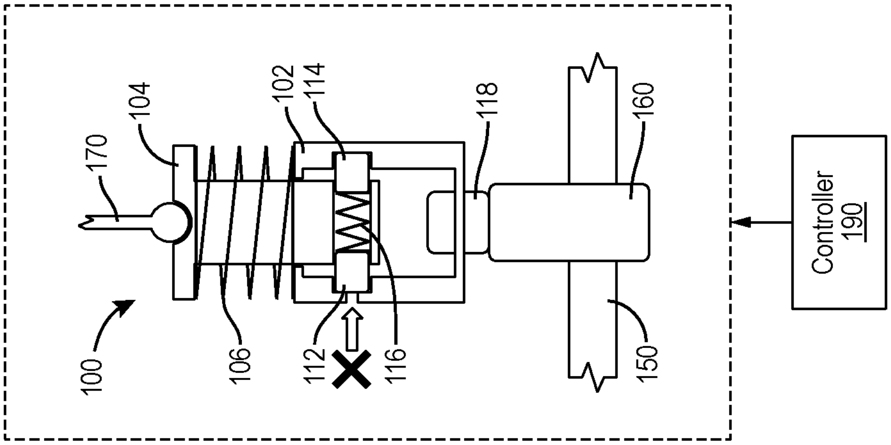

Referring now to FIGS. 1A-C, a controller 190 coupled to a coupling mechanism 100 (e.g., coupling system, coupler, decoupling system, valve retainer system or assembly, valve holding assembly or system, etc.) for enabling a CDA mode operation is shown, according to an exemplary embodiment. In one embodiment, this system is implemented in a vehicle. The vehicle may include an on-road or an off-road vehicle including, but not limited to, line-haul trucks, mid-range trucks (e.g., pick-up trucks), cars, boats, tanks, airplanes, locomotives, mining equipment, and any other type of vehicle that may utilize a CDA mode. The vehicle may include a powertrain system, a fueling system, an operator input/output device, one or more additional vehicle subsystems, etc. It should be understood that the vehicle may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset.

While not shown, this system is used with an engine system. The engine of the engine system may be structured as any internal combustion engine (e.g., compression-ignition or spark-ignition), such that it can be powered by any fuel type (e.g., diesel, ethanol, gasoline, etc.). The engine system may include an air intake system and exhaust aftertreatment system. The exhaust aftertreatment system may be configured to treat exhaust gas emissions to obtain more environmentally friendly emissions (e.g., reduce particulate matter or NOx emissions). In some alternate embodiments, the engine system may be used with a hybrid vehicle.

The engine includes a plurality of cylinders, with each cylinder including a piston and various valves to allow air to enter the cylinder (e.g., intake valves) and to allow exhaust fumes to exit the cylinder (e.g., exhaust valves). Each valve is coupled to a cylinder by a coupling mechanism that is structured to open and close the valve in response to rotation of a camshaft.

The list of elements that comprise the coupling mechanism 100 are also referred to herein as CDA components. Thus, the CDA components may include, but are not limited to, an outer body 102, an inner body 104, and a first spring 106. As described herein, a life factor may be used to determine whether to deactivate the coupling mechanism 100 to enter CDA mode or activate the coupling mechanism 100 to exit CDA mode.

The inner body 104 is sized to partially extend into the outer body 102, and the first spring 106 is positioned between a top portion of the inner body 104 and a top portion of the outer body 102 so as to bias the inner body 104 away from the outer body 102. The coupling mechanism 100 is coupled to a controller 190 that is configured to at least partly control the operation of the coupling mechanism 100. The controller 190 is further described with reference to FIG. 3A.

The outer body 102 includes a first notch 108 and a second notch 110 positioned opposite the first notch 108. The first notch 108 and the second notch 110 are recessed portions of an inner wall of the outer body 102. The first notch 108 is sized to receive a first pin 112 and the second notch 110 is sized to receive a second pin 114. A second spring 116 is disposed between the first pin 112 and the second pin 114 so as to bias the first pin and the second pin away from each other. In embodiments where the first pin 112 and the second pin 114 are aligned with the first notch 108 and the second notch 110, respectively, the second spring pushes the first pin 112 into the first notch 108 and the second pin 114 into the second notch 110. The second spring 116, at least a portion of the first pin 112, and at least a portion of the second pin 114 are positioned so as to extend through the inner body 104.

A follower 118 is coupled, and particularly rotatably coupled, to a bottom portion of the outer body 102 and is in contact with a cam 160. The cam 160 is rigidly coupled to a camshaft 150 that is configured to rotate during operation of an engine. As the camshaft 150 rotates, the cam 160 rotates, causing the force of the cam 160 to be transferred to the outer body 102 via the follower 118.

The inner body 104 is coupled to a push tube 170, and the push tube 170 is coupled to a valve (not shown) such that, as the push tube 170 moves, the valve coupled to the push tube 170 opens and closes.

The operation of the first pin 112 and the second pin 114 is controlled by a flow of pressurized fluid, particularly oil. Of course, in other embodiments, a different fluid or actuation means may be used (e.g., pressurized gas, hydraulic fluid, etc.). Further, in still other embodiments, the present disclosure may be applicable with electronically actuated valve trains. In this regard, the electronically actuated valve trains may also suffer from wear and, as such, the principles discussed herein may be applicable with these configurations as well. Therefore, the description herein regarding an oil control solenoid is not meant to be limiting in that this is the only configuration that is applicable with the present disclosure.

As shown in FIGS. 1A and 1C, pressurized oil is not flowing into the outer body 102 (as indicated by the "X" and the arrow in FIG. 1A). Accordingly, there is no force to counteract the force of the second spring 116, which pushes the first pin 112 into the first notch 108 and the second pin 114 into the second notch 110, thereby preventing the inner body 104 from moving relative to the outer body 102. As the camshaft 150 rotates, the cam 160 also rotates and causes the follower 118 to move the coupling mechanism 100 (in particular, the outer body 102 and the inner body 104 move as a single unit). As shown in FIG. 1A, when the cam 160 is in a first position, the push tube 170 is moved up. As shown in FIG. 1C, when the cam 160 is in a second position, the push tube 170 is moved down. In an example embodiment, when the push tube 170 is moved up, a valve is opened and when the push tube 170 is moved down, the valve is closed.

As shown in FIG. 1B, pressurized oil is flowing into the outer body 102 (as indicated by the check mark and the arrow) to initiate the CDA mode (e.g., the intake and/or exhaust valves for at least one cylinder remain closed for at least one cycle). Alternatively, a cylinder may be deactivated by leaving both the intake and exhaust valve closed or either one of the valves. The pressurized oil exerts a force on the first pin 112 and the second pin 114 to compress the second spring 116 and dislodge the first pin 112 from the first notch 108 and the second pin 114 from the second notch 110. In this configuration, the outer body 102 can move relative to the inner body 104. Accordingly, when the cam 160 is in the first position (e.g., the position as shown in FIG. 1A), the top surface of the outer body 102 pushes against the first spring 106, causing the first spring 106 to compress as the outer body 102 moves relative to the inner body 104. Because the inner body 104 does not move, the push tube 170 remains in the down position, and the valve associated with the push tube 170 stays closed.

Figure 2B:
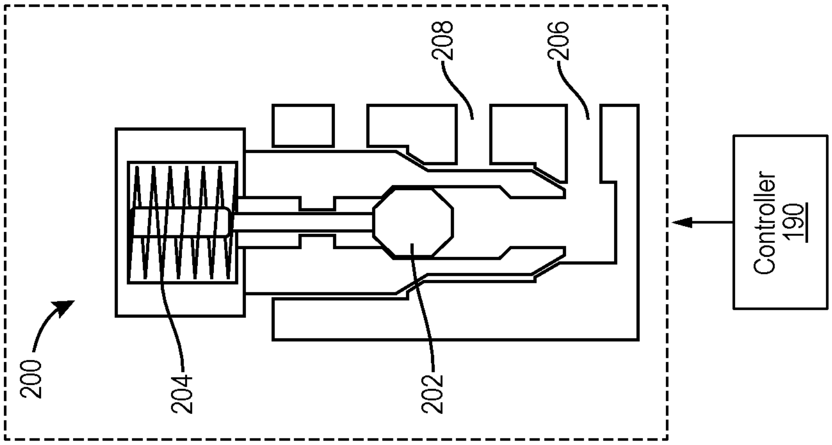
FIGS. 2A-B are illustrations of a controller coupled to an oil control solenoid that operates the coupling mechanism of FIG. 1, according to an exemplary embodiment.
Figure 2A:
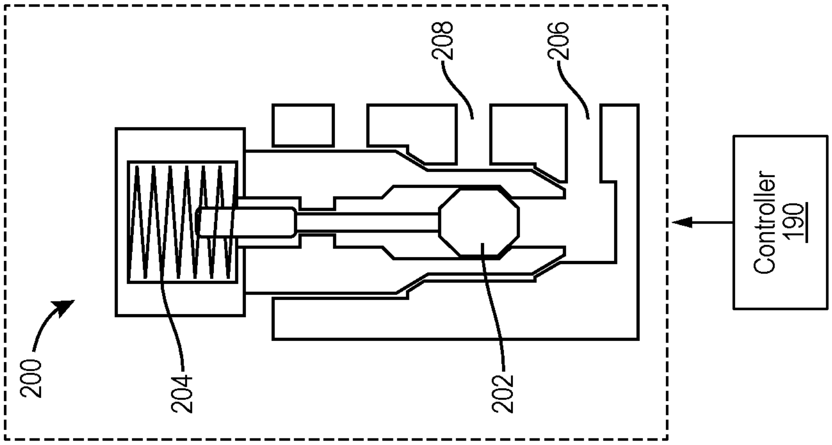

FIGS. 2A-B are illustrations of a controller coupled to an oil control solenoid that operates the coupling mechanism 100 of FIG. 1, according to an exemplary embodiment. The oil control solenoid 200 is a CDA component. In some embodiments, one or more coupling mechanisms are coupled to one or more oil control solenoids (e.g., one or more of the oil control solenoid 200) that control the operation of the one or more coupling mechanisms. When the coupling mechanism is active, the intake and exhaust valves open and close each engine cycle. When the coupling mechanism is not active (e.g., when an engine is in CDA mode and a cylinder is deactivated), the valves remains closed. When a decision to skip a cylinder is made, an oil control solenoid associated with the cylinder is activated. Activating the oil control solenoid provides oil pressure to the coupling mechanism 100, and the coupling mechanism 100 does not move a valve train component (e.g., a rocker arm, push tube, etc.). Accordingly, when the camshaft rotates, the valves associated with the deactivated cylinder are not actuated because the push tube does not move. For each switching event, the flow of oil to the one or more CDA components is permitted or restricted by the one or more oil control solenoids. As the number of switching events increases, the number of on/off cycles (e.g., allowing oil to flow to the first pin 112 and the second pin 114 and then restricting the flow of oil to the first pin 112 and the second pin 114) for the one or more oil control solenoids also increases, thereby increasing the wear and tear on the CDA components.

The oil control solenoid 200 includes a plunger 202, a coil 204, a first oil path 206, and a second oil path 208. The plunger 202 is comprised of at least some magnetic material and is configured to move up in response to a magnetic field induced by a flow of current through the coil 204. The plunger 202 is also configured to move down when the magnetic field is deactivated when the flow of current through the coil 204 is stopped. In the embodiment shown in FIG. 2A, the plunger 202 is in the down position, thereby preventing oil from flowing through the second oil path 208. In some arrangements, when a CDA mode is desirable, a signal is sent from the controller 190 to the oil control solenoid 200 so as to induce a current in the coil 204. When the current is induced, a magnetic field is generated by the flowing current, and the magnetic field attracts the plunger 202 such that the plunger 202 moves upward. Upon moving upward, the second oil path 208 is opened, allowing oil to flow from the first oil path 206 to the second oil path 208. The second oil path 208 leads to the coupling mechanism 100 such that oil flowing through the second oil path 208 contacts the first pin 112 and the second pin 114 to prevent the valve from opening. The oil control solenoid 200 is coupled to the controller 190, which is configured to control the operation of the oil control solenoid 200. The controller 190 is further described with reference to FIG. 3A.

An exemplary embodiment by which intake and exhaust valves of a cylinder can be deactivated to cause a cylinder to enter a CDA mode is provided in FIGS. 1-2. However, various other ways to deactivate intake and exhaust valves can be used with the systems and methods described herein.

Based on the foregoing, an example of operation may be described as follows. The engine is operating in a non-CDA mode of operation and the oil control solenoid 200 is associated with the coupling mechanism 100 (e.g., one oil control solenoid 200 is associated with each coupling mechanism 100, and each coupling mechanism 100 is associated with each valve of a cylinder). During the non-CDA mode of operation, the oil control solenoid 200 does not allow pressurized fluid to reach the coupling mechanism 100, thereby allowing rotation of the camshaft 150 and cam 160 to move the coupling mechanism 100, resulting in normal operation of the intake and exhaust valves. A user may command or the controller 190 may be structured to implement a CDA mode. As a result, the oil control solenoid allows pressurized fluid to reach the first pin 112 and the second pin 114, resulting in the push tube 170 remaining stationary as the camshaft 150 rotates. Accordingly, rotation of the camshaft 150 and cam 160 does not open the intake and exhaust valves (e.g., the intake and exhaust valves remain closed).

Figure 3A:
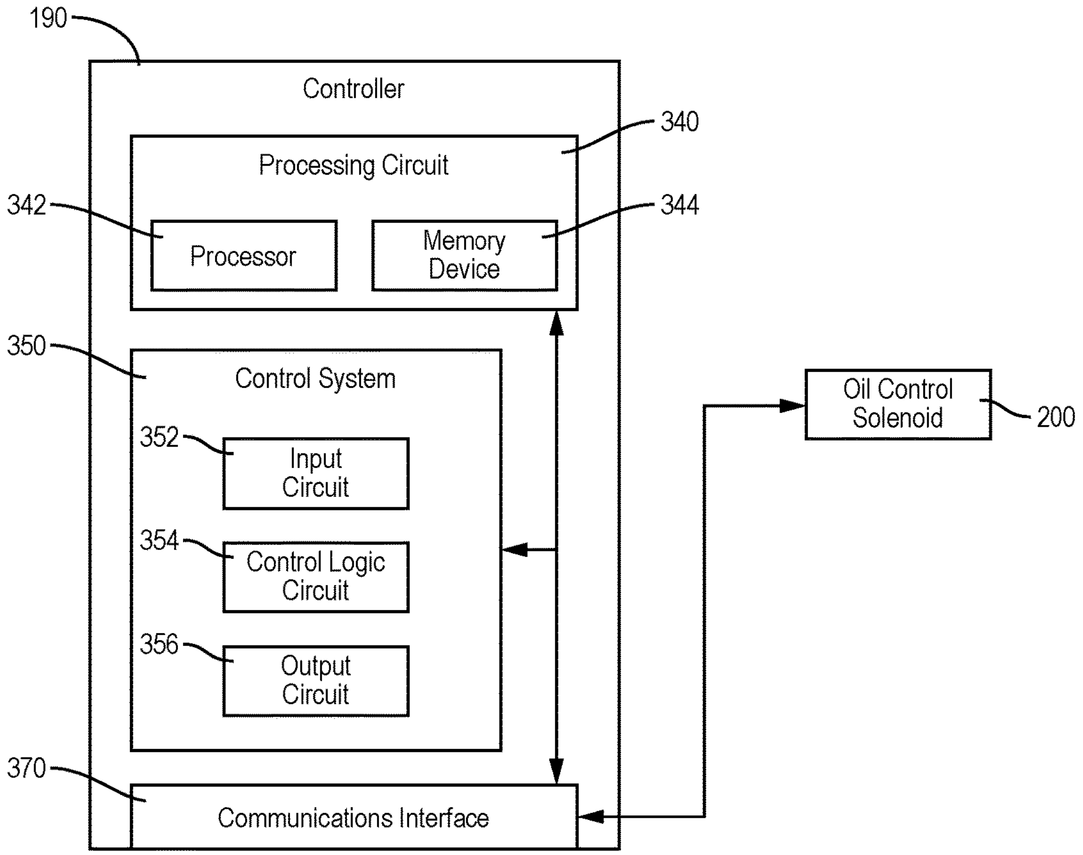
FIG. 3A is a schematic diagram of the controller of FIGS. 1-2, according to an exemplary embodiment.

FIG. 3A is a schematic diagram for the controller 190 of FIGS. 1-2, according to an exemplary embodiment. The controller 190 is structured to receive inputs (e.g., signals, information, data, etc.) from the one or more CDA components. Thus, the controller 190 is structured to control, at least partly, the coupling mechanism 100 and the oil control solenoid 200. As the components of FIG. 3A can be embodied in a vehicle, the controller 190 may be structured as one or more electronic control units (ECU). The controller may be separate from or included with at least one of a transmission control unit, an exhaust aftertreatment control unit, a powertrain control module, and engine control module, etc.

The controller 190 includes a processing circuit 340 having a processor 342 and a memory device 344, a control system 350 having an input circuit 352, a control logic circuit 354, and an output circuit 356, and a communications interface 370.

In one configuration, the input circuit 352, the control logic circuit 354, and the output circuit 356 are embodied as machine or computer-readable media that is executable by a processor, such as processor 342 and stored in a memory device, such as memory device 344. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the input circuit 352, the control logic circuit 354, and the output circuit 356 are embodied as hardware units, such as electronic control units. As such, the input circuit 352, the control logic circuit 354, and the output circuit 356 may be embodied as one or more circuitry components including, but not limited to, processing circuitry, network interfaces, peripheral devices, input devices, output devices, sensors, etc. In some embodiments, the input circuit 352, the control logic circuit 354, and the output circuit 356 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the input circuit 352, the control logic circuit 354, and the output circuit 356 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The input circuit 352, the control logic circuit 354, and the output circuit 356 may also include programmable hardware devices such as field programmable gate arrays, programmable array logic, programmable logic devices or the like. The input circuit 352, the control logic circuit 354, and the output circuit 356 may include one or more memory devices for storing instructions that are executable by the processor(s) of the input circuit 352, the control logic circuit 354, and the output circuit 356. The one or more memory devices and processor(s) may have the same definition as provided below with respect to the memory device 344 and processor 342. In some hardware unit configurations, the input circuit 352, the control logic circuit 354, and the output circuit 356 may be geographically dispersed throughout separate locations in, for example, a vehicle. Alternatively and as shown, the input circuit 352, the control logic circuit 354, and the output circuit 356 may be embodied in or within a single unit/housing, which is shown as the controller 190.

In the example shown, the controller 190 includes the processing circuit 340 having the processor 342 and the memory device 344. The processing circuit 340 may be structured or configured to execute or implement the instructions, commands, and/or control processes described herein with respect to the input circuit 352, the control logic circuit 354, and the output circuit 356. The depicted configuration represents the input circuit 352, the control logic circuit 354, and the output circuit 356 as machine or computer-readable media that may be stored by the memory device. However, as mentioned above, this illustration is not meant to be limiting as the present disclosure contemplates other embodiments where the input circuit 352, the control logic circuit 354, and the output circuit 356, or at least one circuit of the input circuit 352, the control logic circuit 354, and the output circuit 356, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 342) may be implemented or performed with a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the input circuit 352, the control logic circuit 354, and the output circuit 356 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 344 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 344 may be coupled to the processor 342 to provide computer code or instructions to the processor 342 for executing at least some of the processes described herein. Moreover, the memory device 344 may be or include tangible, non-transient volatile memory or non-volatile memory. Accordingly, the memory device 344 may include database components, object code components, script components, or any other type of information structure for supporting the various activities and information structures described herein.

The input circuit 352 is structured to receive information from one or more oil control solenoids (e.g., the oil control solenoid 200) and/or one or more sensors coupled to the one or more oil control solenoids via the communications interface 370. The sensors may include one or more of an optical sensor (e.g., to determine a position of a plunger in an oil control solenoid), a flow sensor (e.g., to determine a flow rate of pressurized lubricant through an oil control solenoid), or any other type of sensor that can provide information related to the operation of an oil control solenoid. In some arrangements, the information generated by the sensors is sent to the control logic circuit 354 wirelessly (e.g., the sensors include a wireless transmitter to transmit information and the control logic circuit 354 includes a wireless receiver to receive the information). The information generated by the sensors can also be sent to the control logic circuit 354 via a wired connection. The input circuit 352 may modify or format the sensor information (e.g., via analog/digital converter) so that the sensor information can be readily used by the control logic circuit 354. In some embodiments, the sensor information may include the number of times the oil control solenoid has cycled from a first position (e.g., a position that prevents the flow of oil) to a second position (e.g., a position that allows the flow of oil).

The control logic circuit 354 is structured to receive information regarding the oil control solenoid 200 from the input circuit 352 and to determine CDA control parameters based on the information. For example, the control logic circuit 354 can determine whether the vehicle should operate in CDA mode, which cylinders will be fired and which cylinders will be skipped when in CDA mode, the number of cycles during which the CDA mode will operate, etc. As used herein, "control parameters" refer to values or information determined within the control logic circuit 354 by the embedded control logic, model, algorithm, or other control scheme. The control parameters may include values or information that represents a status or a state of a vehicle system, a predictive state information, or any other values or information used by the control logic circuit 354 to determine what the controller 190 should do or what the outputs should be.

For a CDA system, a complex control scheme is needed to balance requirements to meet a requested torque demand at an optimum fuel efficiency, while maintaining acceptable NVH levels. In order to control the technology needed to meet these requirements, "control parameters" are needed to understand the current state of the components and how to adjust the actuators. On a typical modern diesel engine, there are on the order of thirty sensors and fifteen actuators. This includes items like: air handling components, including variable geometry turbochargers, EGR valves, throttles, variable valve actuators, etc.; combustion, including multiple fuel injection events varying in quantity and timing, fuel pressure, etc.; and aftertreatment, including catalyst bed temperatures, stored constituents (like ammonia or particulates), progress towards filling or regeneration of the catalyst, special cleaning events, etc.

In some embodiments, the control logic circuit 354 includes algorithms or traditional control logic (e.g., PIDs, etc.). In some embodiments, the control logic circuit 354 includes modelling architecture for component integration or other model based logic (e.g., physical modelling systems that utilize lookup tables). In some embodiments, the control logic circuit 354 utilizes one or more lookup tables stored on the memory device 344 for determination of the control parameters. In some embodiments, the control logic circuit 354 may include artificial intelligence or machine learning circuits, or fuzzy logic circuits, as desired. In one embodiment, the control logic circuit 354 may receive a request related to a CDA mode, and determine a control parameter in the form of activating or deactivating one or more cylinders.

The output circuit 356 is structured to receive the control parameters from the control logic circuit 354 and provide outputs in the form of actuation information (e.g., the "output") to the oil control solenoid 200 via the communications interface 370. In some embodiments, the output circuit 356 receives a life factor value for the CDA components from the control logic circuit 354 and outputs a signal to the oil control solenoid 200 to achieve the life factor value.

Figure 3B:
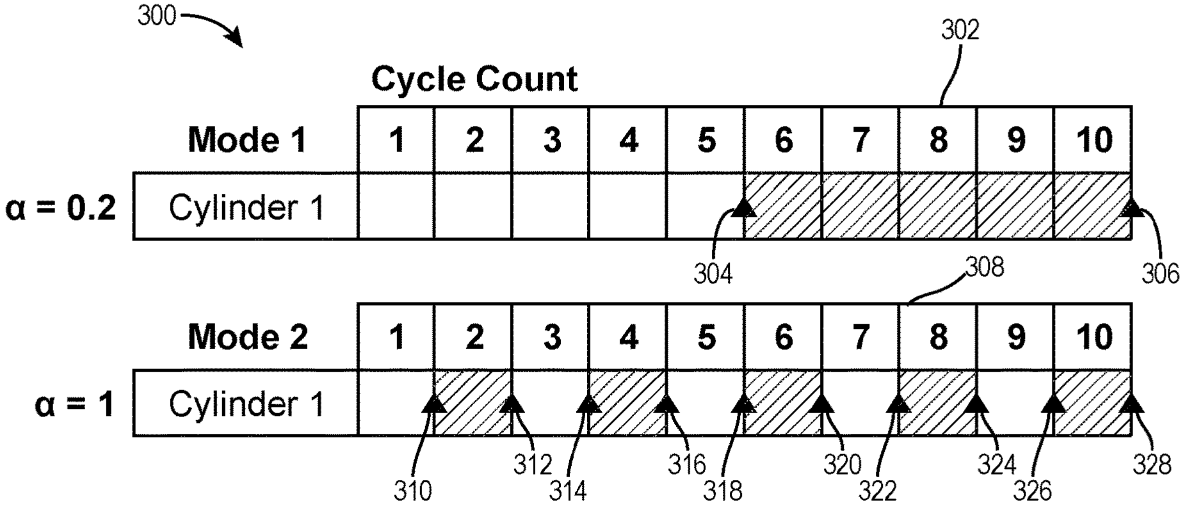
FIG. 3B is an illustration of a cycle count chart for different CDA modes, according to an exemplary embodiment.

FIG. 3B is an illustration of a cycle count chart 300 for different CDA modes, according to an exemplary embodiment. The cycle count chart 300 includes a mode one chart 302 and a mode two chart 308. Both the mode one chart 302 and the mode two chart 308 show an example CDA mode for a cylinder of an engine. The mode one chart 302 and the mode two chart 308 each include ten example cycles (e.g., each cycle corresponds to a full cylinder cycle that includes an intake stroke, a compression stroke, a combustion stroke, and an exhaust stroke). The light boxes refer to cycles in which the cylinder is active. The dark boxes refer to cycles in which the cylinder is inactive.

The mode one chart 302 includes a first switching event 304 and a second switching event 306, where the switching events 304 and 306 indicate the cylinder is switching from one mode (e.g., active or inactive) to the other mode (the other of active or inactive). The first switching event 304 occurs between cycle five and cycle six when the cylinder switches from active to inactive. The second switching event 306 occurs after cycle ten and before cycle one (presuming the pattern repeats after every ten cycles) when the cylinder switches from inactive to active.

The mode two chart 308 includes a plurality of switching events 310-328 where the switching events 310-328 indicate the cylinder is switching from one mode (e.g., active or inactive) to the other mode. In the mode one chart 302 and the mode two chart 308, the cylinder is active for five cycles and is inactive for five cycles. However, the number of switching events in the mode one chart 302 (e.g., only two switching events) is lower than the number of switching events in the mode two chart 308 (e.g., ten switching events). A Dynamic Cylinder Deactivation Life Factor (hereinafter referred to as the "life factor") is defined by the following equation:

$$\alpha = \frac{\sum \text{switching events in } CDA \text{ mode}}{\sum \text{cycle count in } CDA \text{ mode}} \tag{1}$$

In equation (1), the switching events refer to the number of times a cylinder is switched from one mode to the other, and the cycle count refers to the total number of repeating cycles in a CDA mode. For example, the mode one chart 302 and the mode two chart 308 include ten cycles that repeat during the CDA mode. Accordingly, the cycle count for the mode one chart 302 and the mode two chart 308 is ten. The mode one chart 302 includes two switching events (e.g., the first switching event 304 and the second switching event 306) and the mode two chart 308 includes ten switching events (e.g., the switching events 310-328).

Applying equation (1) to the mode one chart 302 and the mode two chart 308, $\alpha_{one}=0.2$ and $\alpha_{two}=1.0$. Thus, the life factor (e.g., $\alpha$) provides a value (e.g., a single number) that indicates the amount of wear on the one or more CDA components. A higher number indicates a higher amount of wear (the life factor can have any value between zero and one) whereas a lower number represents a lower amount of wear. Thus, the life factor helps to diagnose or perform a prognosis on the one or more CDA components. Though the life factor above was calculated for a single cylinder (and is calculated on a cylinder-by-cylinder basis), the life factor can be calculated for multiple cylinders individually within an engine, and/or for all of the cylinders of an engine in aggregate. Moreover and because each cylinder has its own determined alpha value, an examination of alpha across all the cylinders is then possible. Further examples of the calculation of the life factor are shown in FIGS. 4A-4C.

Figure 4A:
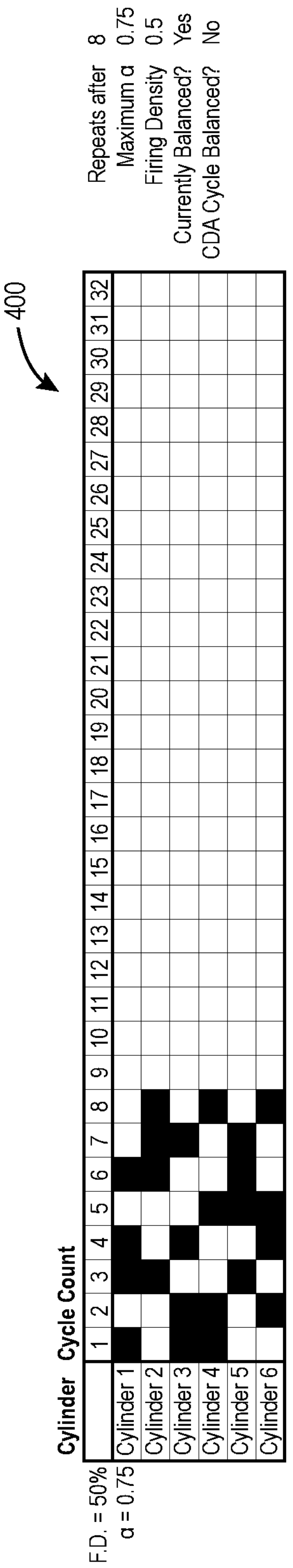
FIGS. 4A-C are illustrations of various cycle count charts for a six-cylinder engine, according to an exemplary embodiment.
Figure 4B:
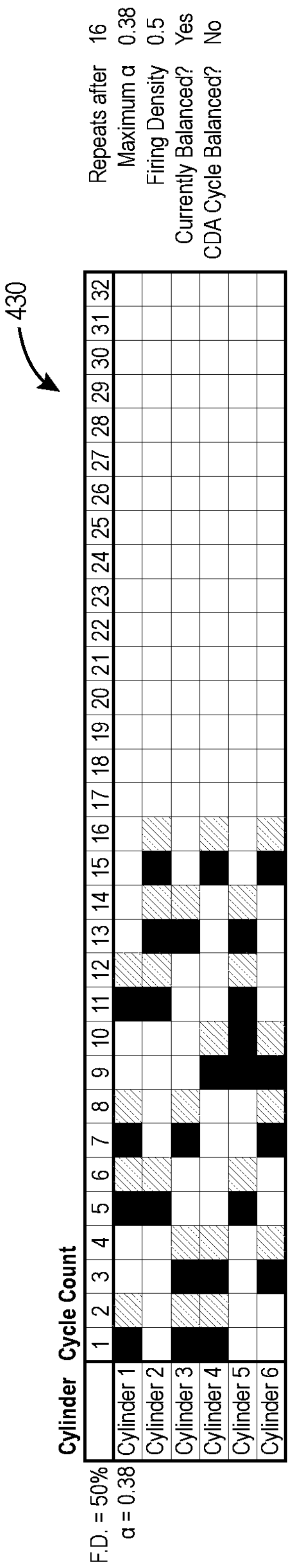
Figure 4C:
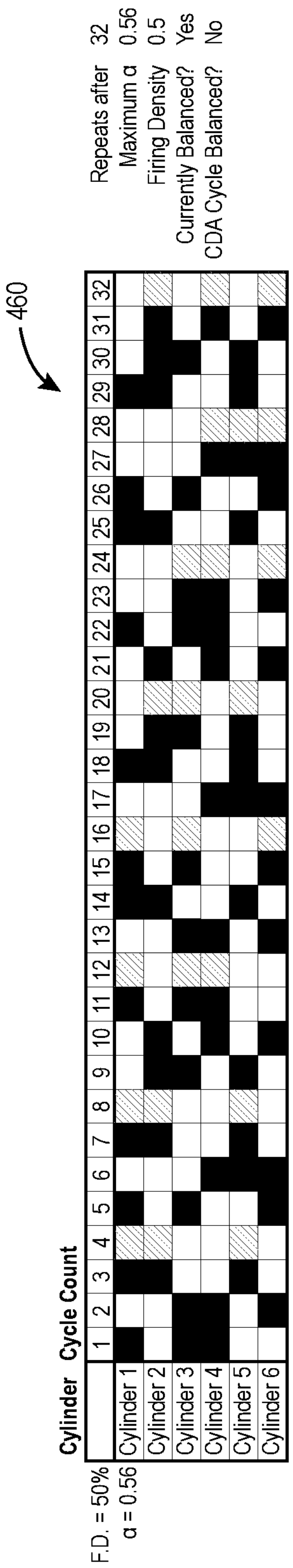

FIGS. 4A-C are illustrations of a cycle count chart 400, a cycle count chart 430, and a cycle count chart 460, each for a six-cylinder engine, according to an exemplary embodiment.

The cycle count chart 400, the cycle count chart 430, and the cycle count chart 460 follow the same conventions as the mode one chart 302 and the mode two chart 308 (e.g., an active cylinder is light and an inactive cylinder is dark). The cycle count chart 400 shows a CDA scheme that includes eight cycles that repeat. The cycle count chart 430 shows a CDA scheme that includes sixteen cycles that repeat, and the cycle count chart 460 shows a CDA scheme that includes thirty-two cycles that repeat. In each of the cycle count charts, the firing density is found using the following equation:

$$FD = \frac{\sum \text{cylinder firings in } CDA \text{ mode}}{\sum \text{cycle count in } CDA \text{ mode}} \quad (2)$$

In equation two, the cylinder firings refers to the number of times a cylinder (or group of cylinders) is active during one of the repeating cycles in a CDA mode, and the cycle count refers to the total number of repeating cycles in the CDA mode. Taking the cycle count chart 400 as an example, each of cylinders 1-6 is active for four cycles and is inactive for four cycles. Accordingly, FD=0.5 for cycle count chart 400.

In FIGS. 4A-C, balanced cylinders refers to how many times each cylinder is active relative to the other cylinders. For example, if one cylinder is active six times during a CDA mode and all other cylinders are active three times, the cylinders are not balanced. As shown in the cycle count chart 400, the cycle count chart 430, and the cycle count chart 460, the cylinders are balanced (e.g., each cylinder is active four times in the cycle count chart 400, each cylinder is active eight times in the cycle count chart 430, and each cylinder is active sixteen times in the cycle count chart 460). Though the embodiments shown include balanced cylinders, in some embodiments the cylinders may be unbalanced.

In addition, a balanced CDA mode is a CDA mode in which each cylinder has the same number of switching events. For example, if one cylinder has six switching events during a CDA mode and all other cylinders have four switching events, the CDA mode is not balanced. As shown in the cycle count chart 400, the cycle count chart 430, and the cycle count chart 460, the CDA modes are not balanced. For example, cylinder one in the cycle count chart 400 has six switching events and cylinder two has four switching events. Though the embodiments shown include unbalanced CDA modes, in some embodiments the CDA modes may be balanced.

Though each of the cycle count chart 400, the cycle count chart 430, and the cycle count chart 460 shows an unbalanced CDA mode with balanced cylinders, the life factors for each of the cycle count chart 400, the cycle count chart 430, and the cycle count chart 460 are different. The life factor for the cycle count chart 400 is 0.75, the life factor for the cycle count chart 430 is 0.38, and the life factor for the cycle count chart 460 is 0.56. The life factor values indicate that the cycle count chart 430 will provide fewer overall switching events as compared to the cycle count chart 400 and the cycle count chart 460, thereby indicating that the one or more CDA components used in an engine that follows the cycle count chart 430 will last for a longer period than the one or more CDA components used in engines that follow the cycle count chart 400 and the cycle count chart 460.

A CDA mode can be modified by a controller (e.g., the controller 190 of FIG. 1) to change one or more of the life factor, the firing density, the cylinder balance, and the CDA cycle balance. The modification of the CDA mode can include modifying the number of switching events, modifying the order in which the cylinders fire, modifying the overall pattern in which the cylinders fire, and any combination thereof. For example, in instances where the engine requires additional power while in CDA mode, it may be beneficial for the controller 190 to activate additional cylinders to achieve the required power, thereby increasing the life factor or maintaining the life factor at a relatively high level.

Though each of the cycle count chart 400, the cycle count chart 430, and the cycle count chart 460 shows a cycle chart for an engine with six cylinders, one of ordinary skill would appreciate that this concept could be applied across different engine types (e.g., spark-ignition versus compression-ignition) with different and various numbers of cylinders.

The cycle count charts 400, 430, and 460 provide different firing orders and firing patterns. As described herein, a firing order refers to which cylinders are fired during a cycle. For example, and with reference to the cycle count chart 400, the firing order during cycle one shows that cylinders two, five, and six are active. As further described herein, a firing pattern refers to a repeated group of firing orders. For example, and with reference to the cycle count chart 400, the firing pattern for cylinders one through six includes the firing orders of the cylinders in cycles one through eight. In other words, after the various cylinder firing orders in cycles one through eight are executed, they are repeated.

Figure 5:
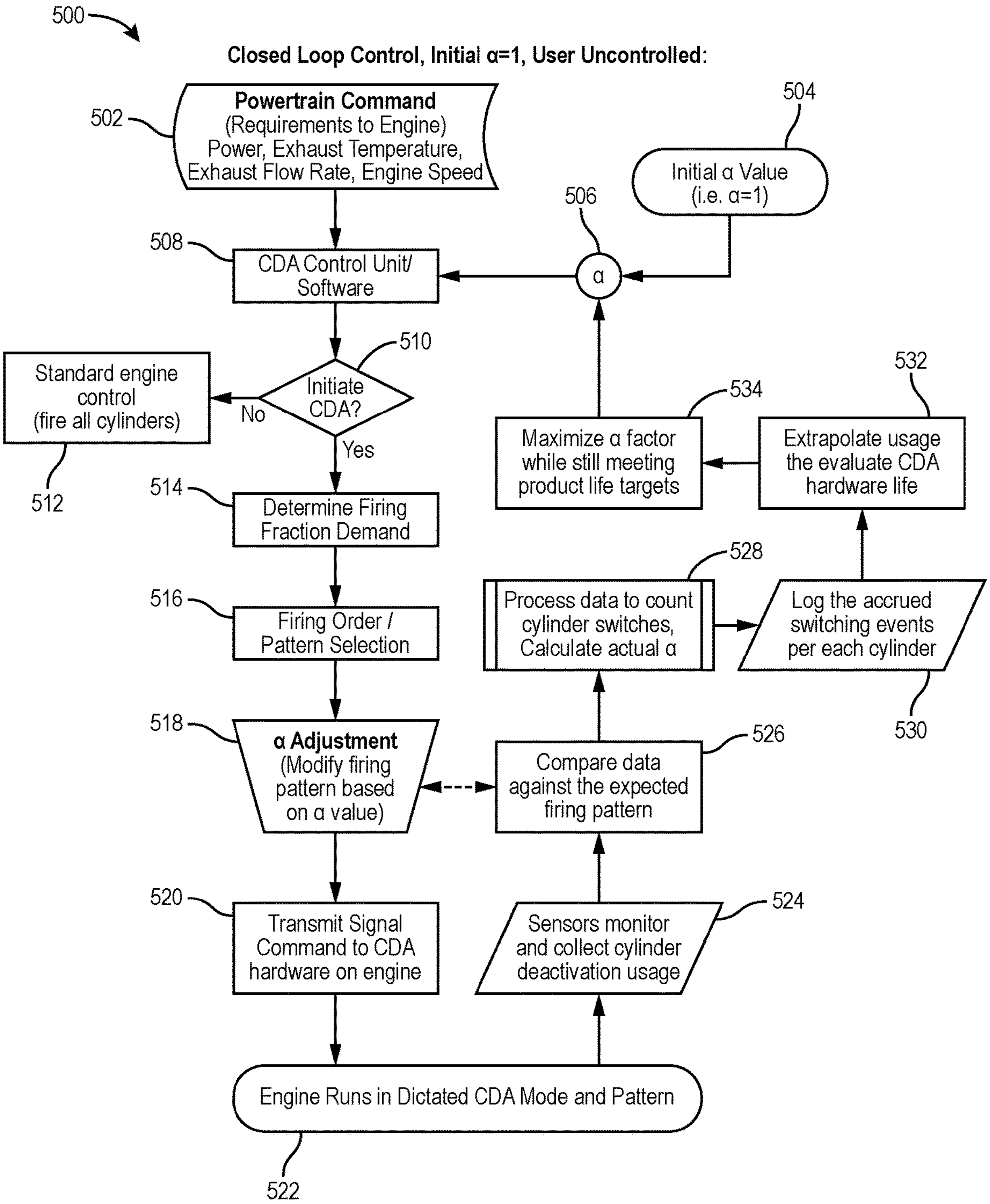
FIG. 5 is a flow diagram of a method to extend the life of one or more CDA components, according to an exemplary embodiment.

FIG. 5 is a flow diagram of a method 500 to extend the life of the one or more CDA components, according to an exemplary embodiment. The method 500 may be implemented, at least in part, by the controller 190 such that reference is made to the controller 190 to aid explanation of the method 500.

At 502, the controller 190 receives an input or other data regarding operation of the system. The input or data may include, but is not limited to, engine power, exhaust temperature, exhaust flow rate, engine speed, etc.

At 504, an initial life factor value for a CDA mode is determined. The initial life factor may be a value between 0 and 1 and, by itself, not be informative regarding the wear on the CDA component. Rather, the initial life factor in combination with information regarding the number of firing opportunities a cylinder has experienced is used to help evaluate potential wear. For example, the initial life factor value may be one. In some embodiments, the initial life factor is set to a specific number at the start of the CDA mode. In some embodiments, the initial life factor is based on a previous life factor or additional inputs.

At 506, the controller 190 generates the initial life factor based on the determination at process 504.

At 508, the controller 190 receives the values of the inputs.

At 510, the controller 190 determines whether to initiate a CDA mode. If the determination is made that the CDA mode should not be initiated, at process 512, all cylinders continue to fire according to normal operation. If the determination is made that the CDA mode should be initiated, at process 514, the firing fraction demand (i.e., the firing density as defined in equation (2)) is determined. For example, the controller 190 may determine that a firing fraction of 0.5 is desirable. In some embodiments, the controller 190 may determine that a firing fraction greater than 0.5 or less than 0.5 is desirable. Increasing the firing density of a group of cylinders leads to an increase in the number of times the cylinders fire during CDA mode, resulting in lower engine efficiency. Decreasing the firing density of a group of cylinders leads to a decrease in the number of times the cylinders fire during CDA mode, resulting in higher engine efficiency.

At 516, the firing order and firing pattern is determined. This determination may be based on one or more look-up tables, models, and the like that is stored in the controller. For example, in some arrangements the controller 190 may determine that a firing order and firing pattern similar to that shown in the cycle count chart 400 is desirable because the firing density is 0.5. Thus, the controller 190 may correlate the firing density to a firing order and pattern based on the firing density. The controller 190 may also determine that another firing order and firing pattern is desirable (e.g., the firing order and firing pattern shown in the cycle count chart 430 or the cycle count chart 460, or any other firing order or firing pattern).

At 518, the firing pattern is modified based on the life factor. Using the cycle count chart 400 as an example, the controller 190 can modify the firing pattern such that the life factor is equal to the initial life factor value (e.g., a value of one in this example).

At 520, a signal from the controller 190 is transmitted to the one or more CDA components to instruct the operation of the one or more CDA components to execute the CDA mode. For example, the signal instructs the coil 204 when to induce a current to actuate the plunger 202 and direct oil to the first pin 112 and the second pin 114, thereby deactivating the valves for the CDA mode.

At 522, the engine runs in the CDA mode based on the signal from the controller 190. At 524, sensors monitor each cylinder and collect data for each cylinder. The sensors may also monitor fewer than all of the cylinders (e.g., the sensors may monitor only those cylinders operating in CDA mode). For example, the sensors may monitor how often a cylinder is activated and deactivated. The sensors may also monitor the efficiency of the engine in the prescribed CDA mode. The sensors may also monitor other attributes related to the cylinders (e.g., temperature, speed, etc.).

At 526, the data from the sensors is compared against the expected performance from the firing pattern. For example, the expected efficiency of the engine is compared against the actual efficiency of the engine. As another example, the expected temperature of a cylinder can be compared to the actual temperature of the cylinder. In some embodiments, the controller 190 can adjust the life factor at 518 based on the data comparison.

At 528, data from cylinders is processed by the controller 190 to determine the actual number of cylinder switches during the CDA mode. The controller 190 calculates the actual life factor based on the data and compares the actual life factor to the initial life factor.

At 530, the accrued switching events are logged for each cylinder. For example, in addition to the number of switching events, other information associated with each switching event for each cylinder is stored by the controller 190. Other information associated with each switching event can include attributes such as the time between switching events, the response time of the associated coupling mechanism to the switching event command from the controller 190, etc.

At 532, the usage of each cylinder is extrapolated to evaluate the life of the one or more CDA components (e.g., the coupling mechanism 100 and the oil control solenoid 200). For example, the controller 190 may receive data from a CDA mode that lasts for a certain duration (e.g., fifteen minutes). The controller 190 uses the data received to determine the usage for the one or more CDA components for each cylinder over time. In certain embodiments, one or more CDA components may be able to withstand a certain number of cycles (e.g., one million cycles) before failure. The controller 190 can use the data received to determine the expected life of the one or more CDA components for each cylinder. For example, the controller 190 may determine that one or more CDA components associated with a first cylinder are expected to last for five years and one or more CDA components associated with a second cylinder are expected to last for six years based on the data received.

At 534, the life factor is maximized while maintaining product life targets. Using the example from 532, the expected life of the engine may be eight years. In order to avoid replacing one or more CDA components prior to the expiration of the expected life of the engine, the controller 190 may modify operation of the CDA mode, thereby adjusting the life factor so as to lengthen the expected life of the one or more CDA components associated with the first cylinder and the one or more CDA components associated with the second cylinder. Based on equation (1), the CDA mode adjustment may include reducing the number of switching events when the engine is in CDA mode. Thus, the CDA mode may be modified based on the expected life of the engine.

In some instances, a higher number of switching events provides for a lower amount of noise, vibration, and harshness than a lower number of switching events. In such instances, a higher number of switching events may be more desirable so as to reduce the amount of noise, vibration, and harshness from the engine. However, a higher number of switching events can reduce the expected life of the one or more CDA components, as described. Accordingly, the controller 190 optimizes the life factor for each cylinder so as to include the maximum number of switching events while ensuring the one or more CDA components have an appropriate expected life. The optimized life factor is then generated and provided at 506, and the method 500 continues until the engine system exits the CDA mode.

If the actual life factor is greater than or equal to the initial life factor, the controller 190 may not modify operation of the engine in CDA mode. In this regard, this situation may indicate that an acceptable amount of wear and tear may be experienced by the CDA component(s) such that no modification of the CDA operating mode is or may be required.

In instances where the actual life factor is less than the initial life factor (e.g., indicating that the level of NVH may be unacceptable), the controller 190 may modify operation of the engine in CDA mode to increase the value of the actual life factor until the value of the actual life factor is greater than or equal to the initial life factor. In this regard, this situation may indicate that an initial level of NVH is unacceptable and the level of wear and tear experienced by the CDA component(s) can or may be increased until the level of NVH is acceptable (e.g., when the initial life factor is reached).

In instances where the expected life of the one or more CDA components is reduced or where the one or more CDA components fail, a notification may be provided to the user to alert the user of the issue. For example, the user may be notified by an alert on a dashboard or console of the vehicle. The alert may be visual and include a symbol, an image, text, or any combination thereof to communicate the issue to the user. The user may also be notified by a sound (e.g., beeping, a voice, etc.) or a combination of a sound and a visual indicator.

Figure 6:
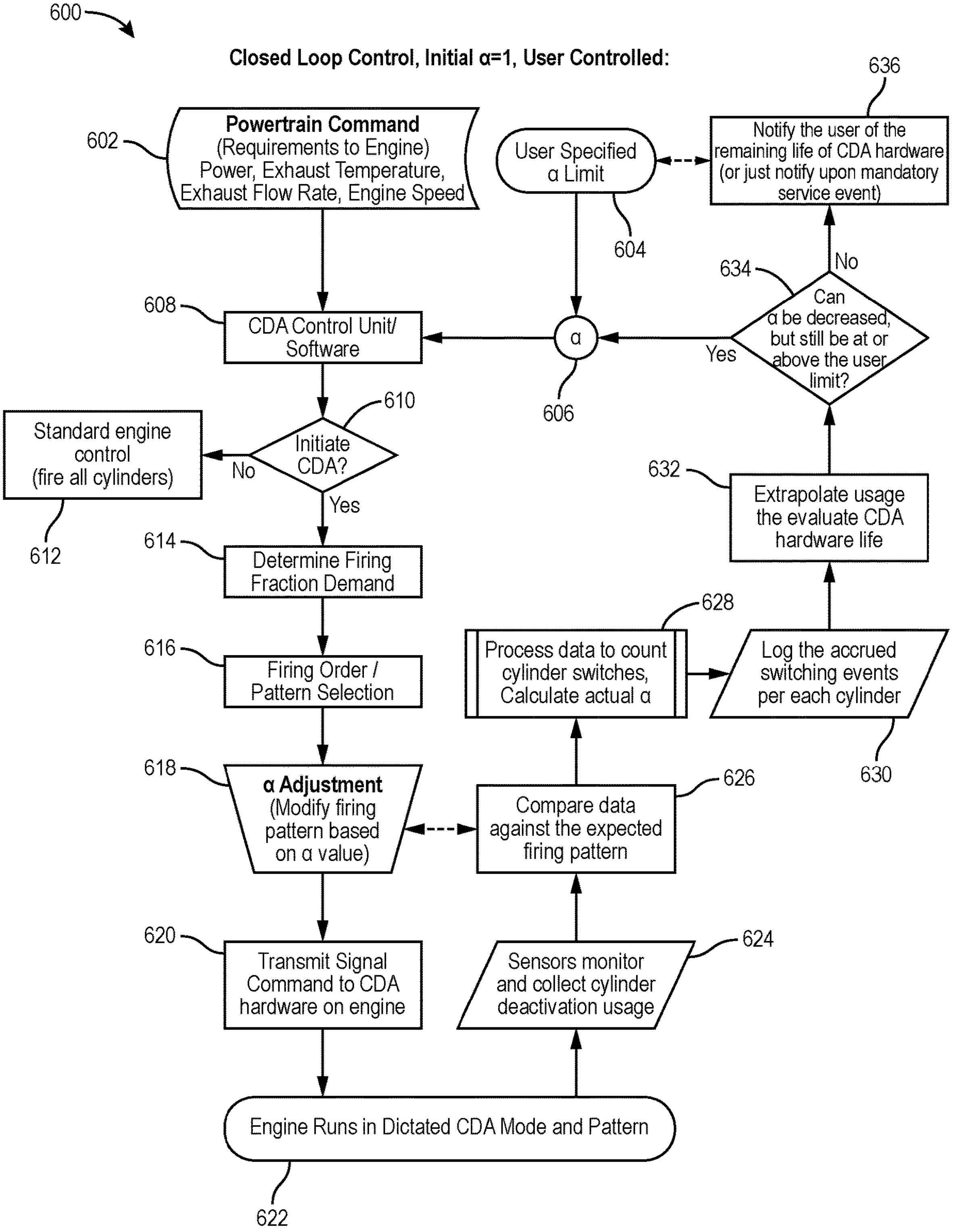
FIG. 6 is a flow diagram of another method to extend the life of one or more CDA components, according to an exemplary embodiment.

FIG. 6 is a flow diagram of another method 600 to extend the life of the one or more CDA components, according to an exemplary embodiment. The method 600 is controlled by a controller 190 in the vehicle and can be modified based on input from a user.

At 602, the controller 190 receives an input or other data regarding operation of the system. The input or data may include, but is not limited to, engine power, exhaust temperature, exhaust flow rate, engine speed, etc.

At 604, a life factor value limit for a CDA mode is provided by the user. For example, the user may specify life factor value limit of 0.75. In some embodiments, the user may know (e.g., from previous experiences) that a life factor value of 0.75 will provide the desired level of NVH that the user can tolerate, and that any number below 0.75 is undesirable.

At 606, the controller generates the initial life factor based on the limit set by the user. The initial life factor can be any life factor value at or above the life factor value limit provided by the user. For example, the initial life factor may be one. The initial life factor may be different than the limit set by the user because the controller may determine that the engine may operate more efficiently at the initial life factor value than the limit set by the user. In other embodiments, the initial life factor value aligns with the set value of the user.

At 608, the controller 190 receives the input/data values.

At 610, the controller 190 determines whether to initiate a CDA mode. If the determination is made that the CDA mode should not be initiated, at 612 all cylinders continue to fire. For example, if the vehicle requires a significant amount of power (e.g., while towing a load up an incline) the CDA mode may not be initiated. If the determination is made that the CDA mode should be initiated (e.g., if the vehicle is traveling at approximately a constant speed on a substantially flat road), at 614 the firing fraction demand (e.g., the firing density) is determined. For example, the controller 190 may determine that a firing fraction of 0.5 is desirable. In some embodiments, the controller 190 may determine that a firing fraction greater than 0.5 or less than 0.5 is desirable.

At 616, the firing order and firing pattern is determined. In some embodiments, the firing order and firing pattern may be determined by choosing values from a lookup table. In some embodiments, the firing order and firing pattern may be determined by a pre-programmed firing pattern and firing order. For example, in some arrangements the controller 190 may determine that a firing order and firing pattern similar to that shown in the cycle count chart 430 is desirable. The controller 190 may also determine that another firing order and firing pattern is desirable (e.g., the firing order and firing pattern shown in the cycle count chart 400 or the cycle count chart 460, or any other firing order or firing pattern).

At 618, the firing pattern is modified based on the life factor. Using the cycle count chart 430 as an example, the controller 190 can modify the firing pattern such that the life factor is equal to the initial life factor value (e.g., a value of one in this example).

At 620, a signal from the controller 190 is transmitted to the one or more CDA components to instruct the operation of the one or more CDA components to execute the CDA mode. In an example embodiment, the signal instructs the coil 204 when to induce a current to actuate the plunger 202 and direct oil to the coupling mechanism 100.

At 622, the engine runs in the CDA mode based on the signal from the controller 190. At 624, sensors monitor each cylinder and collect data for each cylinder. The sensors may also monitor fewer than all of the cylinders (e.g., the sensors may monitor only those cylinder operating in CDA mode). For example, the sensors may monitor how often a cylinder is activated and deactivated. The sensors may also monitor the efficiency of the engine in the prescribed CDA mode. The sensors may also monitor other attributes related to the cylinders (e.g., temperature, speed, etc.).

At 626, the data from the sensors is compared against the expected performance from the firing pattern. For example, the expected efficiency of the engine is compared against the actual efficiency of the engine. As another example, the expected temperature of a cylinder can be compared to the actual temperature of the cylinder. In some embodiments, the controller 190 can adjust the life factor at 618 based on the data comparison.

At 628, data from cylinders is processed by the controller 190 to determine the actual number of cylinder switches during the prescribed CDA mode. For example, the number of expected switches may be four for a specific cylinder, but the actual number of switches counted may be six. In some embodiments, exhaust gas recirculation may cause such a discrepancy. The controller 190 calculates the actual life factor based on the data and compares the actual life factor to the initial life factor.

At 630, the accrued switching events are logged for each cylinder. For example, in addition to the number of switching events, other information associated with each switching event for each cylinder is stored by the controller 190. Other information associated with each switching event can include attributes such as the time between switching events, the response time of the associated coupling mechanism to the switching event command from the controller 190, etc.

At 632, the usage of each cylinder is extrapolated to evaluate the life of the one or more CDA components (e.g., the coupling mechanism 100 and the oil control solenoid 200). For example, the controller 190 may receive data from a CDA mode that lasts for a certain duration (e.g., fifteen minutes). The controller 190 uses the data received to determine the usage for the one or more CDA components for each cylinder over time. In certain embodiments, one or more CDA components may be able to withstand a certain number of cycles (e.g., one million cycles) before failure. The controller 190 can use the data received to determine the expected life of the one or more CDA components for each cylinder. For example, the controller 190 may determine that one or more CDA components associated with a first cylinder are expected to last for five years and one or more CDA components associated with a second cylinder are expected to last for six years based on the data received.

At 634, a determination is made whether the life factor can be decreased but still be above the user specified life factor value limit. For example, the controller 190 determines an optimized life factor value that will optimize the expected life of the one or more CDA components, and the optimized life factor is compared to the life factor value limit specified by the user. If the life factor cannot be decreased (e.g., the life factor is at the life factor value limit), at 636 the controller 190 notifies the user (e.g., via a graphical user interface, etc.) of the remaining life of the one or more CDA components. If the life factor can be decreased to the optimized value, at 606 the optimized life factor is generated and provided at 606, and the method 600 continues until the vehicle exits the CDA mode.

Figure 7:
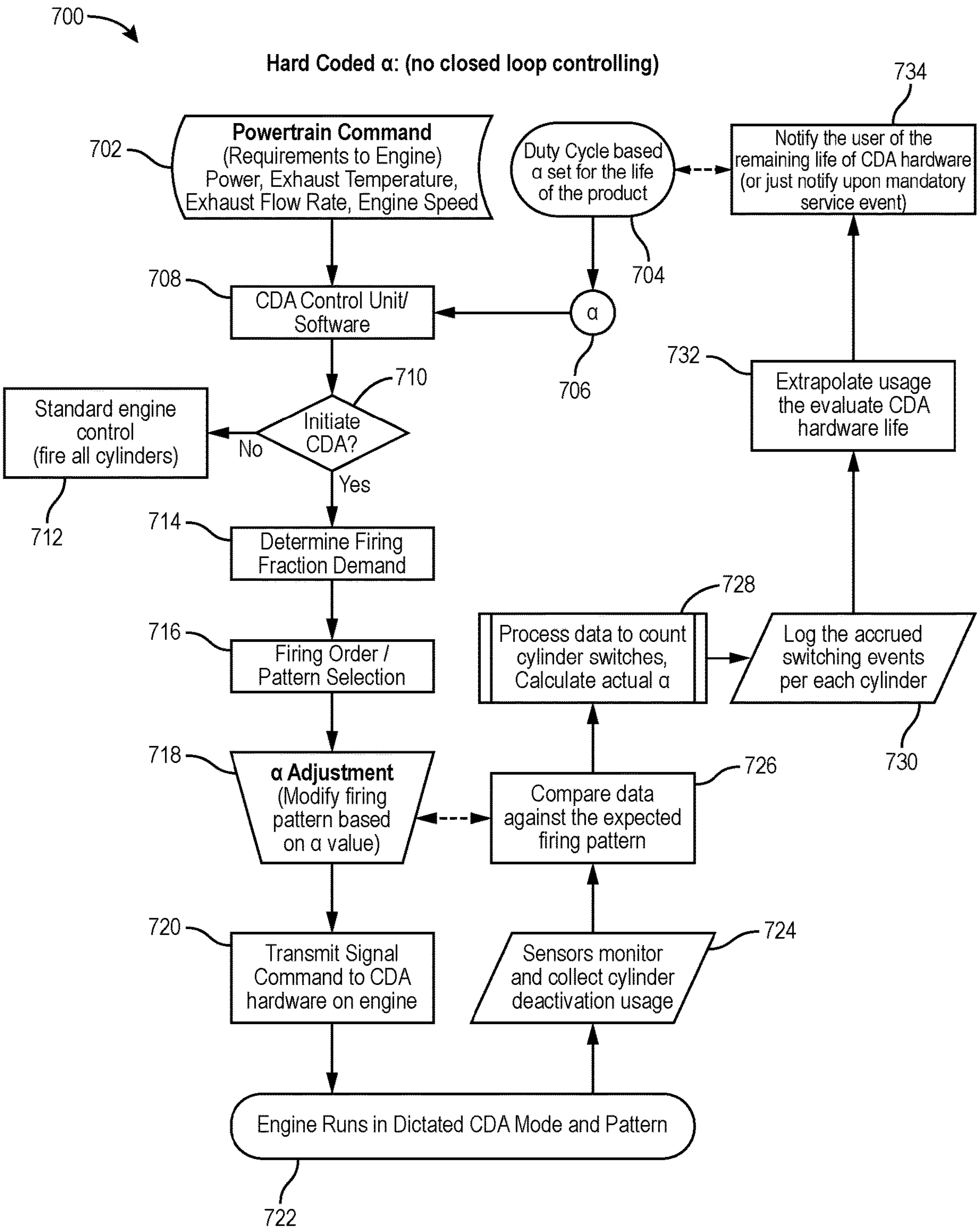
FIG. 7 is a flow diagram of yet another method to extend the life of one or more CDA components, according to an exemplary embodiment.

FIG. 7 is a flow diagram of yet another method 700 to extend the life of one or more CDA components, according to an exemplary embodiment. The method 700 is implemented by the controller 190 and, preferably, without modification based on an input from a user.

At 702, the controller 190 receives an input or other data regarding operation of the system. The input or data may include, but is not limited to, engine power, exhaust temperature, exhaust flow rate, engine speed, etc.

At 704, a life factor value for a CDA mode is provided based on the expected duty cycle for the one or more CDA components (e.g., the duty cycle is the proportion of time the CDA components are operating in CDA mode instead of non-CDA mode). For example, a manufacturer may compile data related to the normal operation of an engine, including how often the engine enters CDA mode and the duration of the CDA mode to determine the duty cycle of the one or more CDA components. From the data, the manufacturer can generate an expected life of the one or more CDA components and generate the life factor based on the duty cycle and the expected life. At 706, the controller 190 generates the life factor. Once set, the life factor cannot be modified.

At 708, the controller 190 receives the values of the engine inputs.

At 710, the controller 190 determines whether to initiate a CDA mode. If the determination is made that the CDA mode should not be initiated, at 712 all cylinders continue to fire. If the determination is made that the CDA mode should be initiated, at 714 the firing fraction demand (e.g., the firing density) is determined. For example, the controller 190 may determine that a firing fraction of 0.5 is desirable. In some embodiments, the controller 190 may determine that a firing fraction greater than 0.5 or less than 0.5 is desirable.

At 716, the firing order and firing pattern is determined. For example, in some arrangements the controller 190 may determine that a firing order and firing pattern similar to that shown in the cycle count chart 460 is desirable. The controller 190 may also determine that another firing order and firing pattern is desirable (e.g., the firing order and firing pattern shown in the cycle count chart 400 or the cylinder control chart 430, or any other firing order or firing pattern).

At 718, the firing pattern is modified based on the life factor. Using the cycle count chart 460 as an example, the controller 190 can modify the firing pattern such that the life factor is equal to the duty cycle life factor value.

At 720, a signal from the controller 190 is transmitted to the one or more CDA components to instruct the operation of the one or more CDA components to execute the CDA mode. For example, the signal instructs the coil 204 when to induce a current to actuate the plunger 202 and direct oil to the coupling mechanism 100.

At 722, the engine runs in the CDA mode based on the signal from the controller 190. At 724, sensors monitor each cylinder and collect data for each cylinder. The sensors may also monitor fewer than all of the cylinders (e.g., the sensors may monitor only those cylinders operating in CDA mode). For example, the sensors may monitor how often a cylinder is activated and deactivated. The sensors may also monitor the efficiency of the engine in the prescribed CDA mode. The sensors may also monitor other attributes related to the cylinders (e.g., temperature, speed, etc.).

At 726, the data from the sensors is compared against the expected performance from the firing pattern. For example, the expected efficiency of the engine is compared against the actual efficiency of the engine. As another example, the expected temperature of a cylinder can be compared to the actual temperature of the cylinder. In some embodiments, the controller 190 can adjust the life factor at 718 based on the data comparison such that the life factor remains at the duty cycle life factor value.

At 728, data from cylinders is processed by the controller 190 to determine the actual number of cylinder switches during the prescribed CDA mode. For example, the number of expected switches may be four for a specific cylinder, but the actual number of switches counted may be six. The controller 190 calculates the actual life factor based on the data and compares the actual life factor to the duty cycle life factor.

At 730, the accrued switching events are logged for each cylinder. For example, in addition to the number of switching events, other information associated with each switching event for each cylinder is stored by the controller 190. Other information associated with each switching event can include attributes such as the time between switching events, the response time of the associated coupling mechanism to the switching event command from the controller 190, etc.

At 732, the usage of each cylinder is extrapolated to evaluate the life of the one or more CDA components (e.g., the coupling mechanism 100 and the oil control solenoid 200). For example, the controller 190 may receive data from a CDA mode that lasts for a certain duration (e.g., fifteen minutes). The controller 190 uses the data received to determine the usage for the one or more CDA components for each cylinder over time. In certain embodiments, one or more CDA components may be able to withstand a certain number of cycles (e.g., one million cycles) before failure. The controller 190 can use the data received to determine the expected life of the one or more CDA components for each cylinder. For example, the controller 190 may determine that one or more CDA components associated with a first cylinder are expected to last for five years and one or more CDA components associated with a second cylinder are expected to last for six years based on the data received.

At 736 the controller 190 notifies the user (e.g., via a graphical user interface, etc.) of the remaining life of the one or more CDA components. In some embodiments, the CDA controller notifies the user when it is necessary to service the one or more CDA components.

In some embodiments, operation of the CDA mode can be based on the expected life of the one or more CDA components. For example, during operation of the engine in CDA mode, the controller may determine that the expected life of the one or more CDA components is substantially shorter than the expected life of the rest of the engine components. To prevent failure of the one or more CDA components prior to failure of the rest of the engine components, the controller may prevent the engine from entering a CDA mode (e.g., disabling the CDA mode). In some instances, the controller may prompt the driver to determine whether to prevent the engine from entering a CDA mode. For example, the controller may communicate with the driver via a graphical user interface (GUI) located in the vehicle, notifying the driver that the one or more CDA components are approaching the end of their useful lives, and that continuing to operate in a CDA mode may cause engine failure. The GUI may provide the user with an option to disable CDA operation or to continue with CDA operation. The controller then operates the engine according to the decision of the driver.

Figure 8:
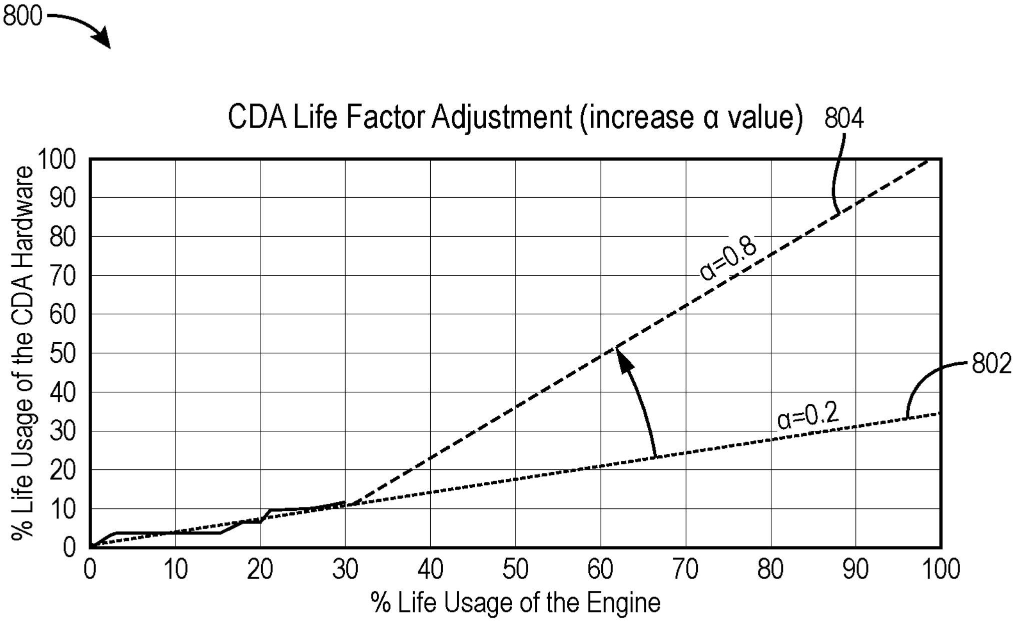
FIGS. 8-9 are charts illustrating the effects of modifying a life factor on the life of one or more CDA components, according to an exemplary embodiment.
Figure 9:
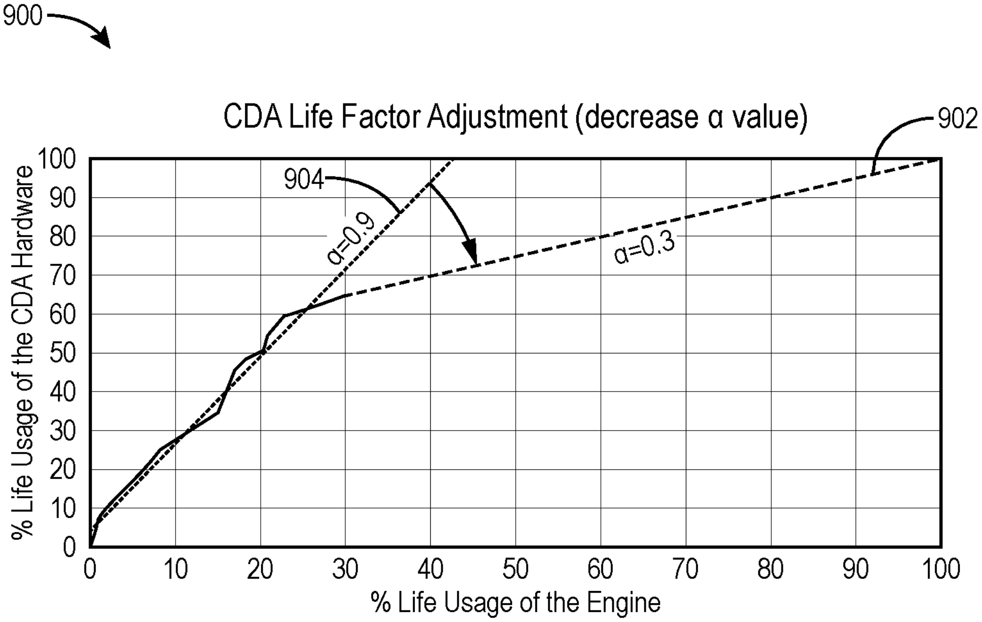

FIGS. 8-9 are charts illustrating the effects of modifying a life factor on the life of one or more CDA components, according to an exemplary embodiment. The chart 800 illustrates the effect of increasing the life factor, and the chart 900 illustrates the effect of decreasing the life factor.

As shown in FIG. 8, when the life factor is relatively low (e.g., as shown by a line 802 corresponding to a life factor of 0.2), when the engine life reaches 100% (e.g., when the engine reaches the end of its useful life) the life of the one or more CDA components is at approximately 35%. To optimize the usage of the one or more CDA components, the life factor can be increased such that when the engine life reaches 100%, the one or more CDA components life also reaches 100%. As shown, increasing the life factor (e.g., as shown by a line 804 corresponding to a life factor of 0.8) optimizes use of the one or more CDA components such that the engine life and the life of the one or more CDA components are the substantially the same.

As shown in FIG. 9, when the life factor is relatively high (e.g., as shown by a line 904 corresponding to a life factor of 0.9), when the one or more CDA components life reaches 100% (e.g., when the one or more CDA components reaches the end of its useful life and needs to be replaced or repaired) the life of the engine is at approximately 43%. To optimize the usage of the one or more CDA components, the life factor can be decreased such that when the one or more CDA components life reaches 100%, the engine life also reaches 100%. As shown, decreasing the life factor (e.g., as shown by a line 902 corresponding to a life factor of 0.3) optimizes the use of the one or more CDA components such that the engine life and the life of the one or more CDA components are substantially the same. Additionally, equalizing the wear of the CDA components over the life of the engine may also be implemented by not waiting until the a predefined low threshold value of engine life remaining.

Figure 10:
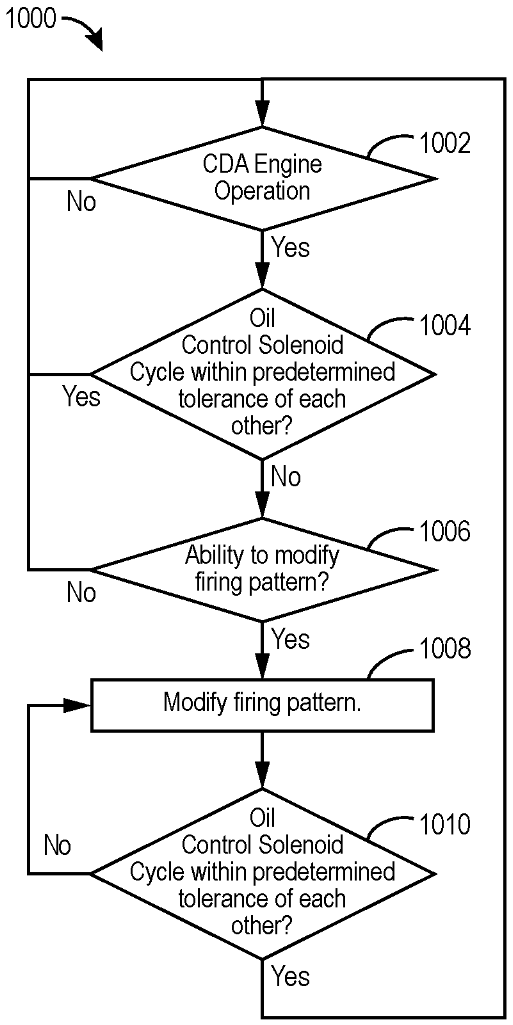
FIG. 10 is a flow diagram of a method of managing a CDA mode based on a cycle count of a CDA component, according to an exemplary embodiment.

FIG. 10 is a flow diagram of a method 1000 of managing a CDA mode based on a cycle count of one or more CDA components, according to an exemplary embodiment.

At 1002, a determination of whether the engine is operating in CDA mode is made. If the determination is made that the engine is not operating in CDA mode, the method 1000 continues to monitor whether the engine is operating in CDA mode at 1002.

If the determination is made that the engine is operating in CDA mode, at 1004 a determination is made as to whether the cycle counts of various oil control solenoids in the engine system are within a pre-determined tolerance of each other. For example, it may be beneficial for each oil control solenoid to have similar cycle counts when operating in CDA mode so as to reduce the likelihood that oil control solenoids with comparatively higher cycle counts will fail, requiring replacement prior to oil control solenoids with comparatively lower cycle counts. By maintaining the cycle counts of each oil control solenoid within a pre-determined tolerance (e.g., within ten percent), the number of maintenance events can be reduced (e.g., when one or more oil control solenoids are in need of maintenance or replacement, it is more likely that all oil control solenoids are in need of maintenance or replacement, and all maintenance can occur at the same time).

If the oil control solenoid cycle counts are within a pre-determined tolerance of each other, the method 1000 continues at 1002 to monitor whether the system is in CDA mode. The pre-determined tolerance of the cycle counts may be based on the expected life of each oil control solenoid. For example, each oil control solenoid may have an expected life of one million cycles, with a margin of error of approximately ten percent (e.g., a typical oil control solenoid may last for 900,000-1,100,000 cycles). The pre-determined tolerance may then be set at 200,000. Thus, if the cycle counts are within 200,000 cycles of each other, the method 1000 continues. If the oil control solenoid cycle counts are not within a pre-determined tolerance of each other (e.g., the cycle counts are not within 200,000 cycles of each other, thereby indicating that one or more oil control solenoids may fail prior to other oil control solenoids), a determination is made at 1006 whether the CDA firing pattern can be modified.

If the CDA firing pattern cannot be modified (e.g., if the pattern is specifically set by the manufacturer to optimize operations), the method 1000 continues at 1002 to monitor whether the system is in CDA mode. If the CDA firing pattern can be modified, at 1008 the CDA firing pattern is modified so as to bring the oil control solenoid cycle counts to within the pre-determined tolerance.

At 1010, a determination is made as to whether the oil control solenoid cycle counts are within a pre-determined tolerance of each other. If the oil control solenoid counts are not within a pre-determined tolerance of each other, the method 1000 returns to 1008 and additional modifications are made to the CDA firing pattern to bring the oil control solenoid cycle counts to within a pre-determined tolerance. If the oil control solenoid counts are within a pre-determined tolerance of each other, the method 1000 returns to 1002 where the CDA mode is monitored.

Figure 11:
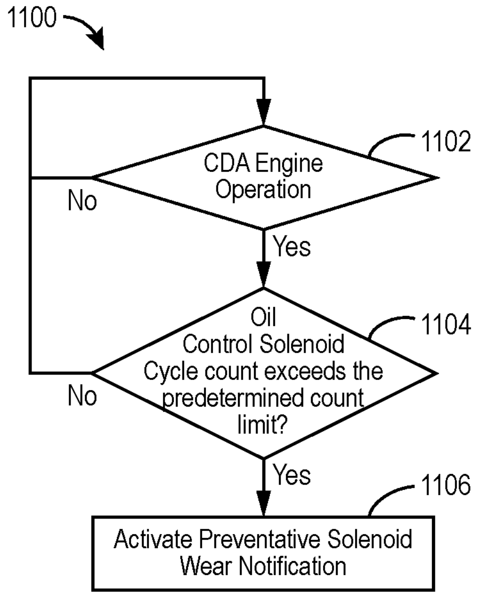
FIG. 11 is a flow diagram of a method of notifying a user of a status of one or more CDA components, according to an exemplary embodiment.

FIG. 11 is a flow diagram of a method of notifying a user of a status of one or more CDA components, according to an exemplary embodiment.

At 1102, a determination of whether the engine is operating in CDA mode is made. If the determination is made that the engine is not operating in CDA mode, the method 1100 continues to monitor whether the engine is operating in the CDA mode at 1102.

If the determination is made that the engine is operating in CDA mode, at 1104 a determination is made as to whether the cycle counts of various oil control solenoids in the engine system exceed a pre-determined cycle count limit. For example, each oil control solenoid may be configured by the manufacturer to last for a certain number of cycles before failure (e.g., the expected life). The pre-determined cycle count limit can be based on the expected life. For example, the pre-determined cycle count limit may be a percentage of the expected life (e.g., 90% of the expected life, 80% of the expected life, etc.).

If the determination is made that the oil control solenoid cycle count does not exceed the pre-determined cycle count limit, the method 1100 returns to 1102 and the determination of whether the engine is operating in CDA mode is made.

If the determination is made that the oil control solenoid cycle count does exceed the pre-determined cycle count limit, at 1106 a preventative solenoid wear notification is activated. For example, the GUI may provide a message to a user that one or more oil control solenoids have exceeded the pre-determined cycle count limit and will require maintenance soon.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 3A it should be understood that the controller 190 may include any number of circuits for completing the functions described herein. For example, the activities and functionalities of the circuits 352-356 may be combined in multiple circuits or as a single circuit. Additional circuits with additional functionality may also be included. Further, the controller 190 may further control other activity beyond the scope of the present disclosure.

As mentioned above and in one configuration, the "circuits" may be implemented in machine-readable medium for execution by various types of processors, such as the processor 342 of FIG. 3A. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A method to extend a life of a component of a cylinder deactivation (CDA) system, comprising:

generating, by a controller, an initial life factor for the component;

initiating, by the controller, a CDA mode for an engine;

determining, by the controller, an actual life factor for the component, the actual life factor determined by comparing a number of switching events of a cylinder in the CDA mode to a number of cycles of the cylinder in the CDA mode;

comparing, by the controller, the actual life factor to the initial life factor; and modifying, by the controller based on the comparison, operation of the engine in the CDA mode to adjust the actual life factor.

2. The method of claim 1, wherein when the actual life factor is greater than the initial life factor, operation of the engine in the CDA mode is modified to decrease the actual life factor, wherein decreasing the actual life factor represents a lower amount of wear on the component.

3. The method of claim 1, wherein when the actual life factor is less than the initial life factor, operation of the engine in the CDA mode is modified to increase the actual life factor, wherein increasing the actual life factor represents a higher amount of wear on the component.

4. The method of claim 1, further comprising:

determining, by the controller, a firing fraction and firing pattern for the engine.

5. The method of claim 4, wherein the determination of the firing fraction and firing pattern includes activating a plunger of an oil control solenoid to close an intake valve of the cylinder in accordance with the determined firing fraction and firing pattern for the engine.

6. The method of claim 1, further comprising monitoring, by the controller, a usage of the cylinder in the CDA mode.

7. The method of claim 1, further comprising determining, by the controller, an expected life of the component.

8. The method of claim 1, further comprising optimizing, by the controller, the actual life factor based on comparing the expected life of the component to a life factor value specified by a user.

9. The method of claim 1, further comprising modifying, by the controller, the CDA mode when the number of cycles exceeds a predetermined threshold, wherein the number of cycles is associated with the component.

10. A system, comprising:

a cylinder deactivation (CDA) system comprising a controller having a processor and instructions stored in non-transitory machine-readable media, the instructions configured to cause the controller to:

generate an initial life factor for a component of the CDA system;

initiate a CDA mode for an engine;

determine an actual life factor for the component by comparing a number of switching events of a cylinder in the CDA mode to a number of cycles of the cylinder in the CDA mode;

determine an expected life of the component;

compare the actual life factor to the initial life factor; and modify operation of the engine in the CDA mode to adjust the actual life factor.

11. The system of claim 10, wherein the instructions are further configured to cause the controller to determine a firing fraction and a firing pattern for the engine.

12. The system of claim 11, wherein the determination of the firing fraction and the firing pattern includes activating a plunger of an oil control solenoid to close an intake valve of the cylinder in accordance with the determined firing pattern and firing order for the engine.

13. The system of claim 10, wherein when the actual life factor is equal to or greater than the initial life factor, the instructions are further configured to cause the controller to maintain operation of the engine in the CDA mode so as to maintain the actual life factor, wherein maintaining the actual life factor represents an acceptable amount of wear and tear on the component.

14. The system of claim 10, wherein when the actual life factor is greater than the initial life factor, the instructions are further configured to cause the controller to modify operation of the engine in the CDA mode to decrease the actual life factor, wherein decreasing the actual life factor represents a lower amount of wear on the component.

15. The system of claim 10, wherein when the actual life factor is less than the initial life factor, the instructions are further configured to cause the controller to modify operation of the engine in the CDA mode to increase the actual life factor, wherein increasing the actual life factor represents a higher amount of wear on the component.

* * * * *